(12) United States Patent
Braunstein

(10) Patent No.: US 7,978,082 B2
(45) Date of Patent: *Jul. 12, 2011

(54) RFID-BASED PERSONNEL TRACKING

(75) Inventor: Andrew Scott Braunstein, Weston, MA (US)

(73) Assignee: HealthWyse, LLC, Reading, MA (US)

( * ) Notice: Subject to any disclaimer, the term of this patent is extended or adjusted under 35 U.S.C. 154(b) by 328 days.

This patent is subject to a terminal disclaimer.

(21) Appl. No.: 12/208,487

(22) Filed: Sep. 11, 2008

(65) Prior Publication Data

US 2009/0002133 A1    Jan. 1, 2009

Related U.S. Application Data

(63) Continuation of application No. 11/346,451, filed on Feb. 2, 2006, now Pat. No. 7,477,154.

(51) Int. Cl.
G08B 23/00    (2006.01)

(52) U.S. Cl. ............... 340/573.1; 340/5.2; 340/5.21; 340/10.1; 340/8.1; 235/377; 235/382

(58) Field of Classification Search ............... 340/573.1, 340/5.2, 5.21, 10.1, 825.49, 572.4; 235/377, 235/82, 385
See application file for complete search history.

(56) References Cited

U.S. PATENT DOCUMENTS

| | | | | |
|---|---|---|---|---|
| 4,688,026 A * | 8/1987 | Scribner et al. | ............... | 235/385 |
| 5,255,183 A * | 10/1993 | Katz | ............... | 705/30 |
| 5,646,839 A * | 7/1997 | Katz | ............... | 379/142.11 |
| 5,682,142 A * | 10/1997 | Loosmore et al. | ............... | 340/572.1 |
| 5,963,912 A * | 10/1999 | Katz | ............... | 705/7 |
| 6,764,013 B2 * | 7/2004 | Ben-Aissa | ............... | 235/472.01 |
| 6,989,749 B2 * | 1/2006 | Mohr | ............... | 340/572.1 |
| 7,114,648 B2 * | 10/2006 | Ginskey et al. | ............... | 235/377 |
| 7,121,471 B2 * | 10/2006 | Beenau et al. | ............... | 235/487 |
| 7,123,149 B2 * | 10/2006 | Nowak et al. | ............... | 340/572.1 |
| 7,180,422 B2 * | 2/2007 | Milenkovic et al. | ............... | 340/572.4 |
| 7,242,303 B2 * | 7/2007 | Patel et al. | ............... | 340/572.4 |
| 7,295,114 B1 * | 11/2007 | Drzaic et al. | ............... | 340/572.1 |

* cited by examiner

*Primary Examiner* — Davetta W Goins
(74) *Attorney, Agent, or Firm* — Holland & Knight LLP; Brian J. Colandreo, Esq.; Mark H. Whittenberger, Esq.

(57) ABSTRACT

Methods and apparatus, including computer program products, for RFID-based personnel tracking. A method of tracking employees includes, in a first computer system, prompting a user for identification input, validating the identification input, receiving data from a first scan of a Radio Frequency Identification (RFID) tag upon initiation of a task, receiving data from a second scan of the RFID tag upon termination of the task, and uploading the identification input and the data of the first and second scans to a second computer system for storage and correlation.

14 Claims, 3 Drawing Sheets

US 7,978,082 B2

RFID-BASED PERSONNEL TRACKING

RELATED APPLICATION

This application is a continuation of and claims priority to U.S. patent application Ser. No. 11/346,451 filed on Feb. 2, 2006.

BACKGROUND

The present invention relates to data processing by digital computer, SmartPhones, personal data assistants, and so forth, and more particularly to RFID-based personnel tracking.

Significant resources and costs are invested by many businesses to keep track of the whereabouts and/or arrival and departure times of their field-based employees, e.g. nurses, field technicians, delivery and repair personnel or the like, at various work sites such as the homes of patients or the like. One computer-based system for reporting the arrival and departure times of employees requires manual intervention and is inherently prone to being abused. These systems do not provide reliable and instantaneously available reports on the work schedules of field employees, such as would enable businesses to complete the preparation of service bills and invoices much sooner.

Another computer-based system accepts telephone calls for inclusion in a report from telephone locations which are included in a valid Automatic Number Identification (ANI) database. ANI is a service that provides the receiver of a telephone call with the number of the calling phone. The method of providing this information is determined by the service provider (such as AT&T, MCI, Sprint, and so forth). The service is often provided by sending the digital tone multi frequency (DTMF) tones along with the call. Call centers can use the information to forward calls to different people for different geographic areas. ANI is commonly used by emergency center dispatchers to save the caller having to report the information and, when necessary, to help locate callers.

SUMMARY

The present invention provides methods and apparatus, including computer program products, for RFID-based personnel tracking.

In one aspect, the invention features a method of tracking employees including, in a first computer system, prompting a user for identification input, validating the identification input, receiving data from a first scan of a Radio Frequency Identification (RFID) tag upon initiation of a task, receiving data from a second scan of the RFID tag upon termination of the task, and uploading the identification input and the data of the first and second scan to a second computer system for storage and correlation.

In embodiments, the first computer system can be a portable computer having an RFID reader. The portable computer having an RFID reader can be a pocket personal computer (PC) with an RFID reader plug-in.

Data from the first and second scan can be time stamped by the first computer system, the time stamp including a date and time. Data from the first and second scan can include site identification.

The method can include generating a report from a correlation of the uploaded identification input and the data of the first and second scan.

The method can include transmitting the report to a report subscriber. The report subscriber can be an employer of the user.

In another aspect, the invention features a method of tracking including, in a local computer system, inputting a user identification from a field-based user, receiving data from a first scan of a Radio Frequency Identification (RFID) tag upon the field-based user's initiation of a task, receiving data from a second scan of the RFID tag upon the field-based field-based user's termination of the task, and storing the user identification and the data of the first and second scan.

In embodiments, the method can include periodically sending the stored user identification and the data of the first and second scan to a remote computer system for storage and manipulation.

The local computer system can be a portable computer having an RFID reader. The portable computer having an RFID reader can be a pocket personal computer (PC) with an RFID reader plug-in.

Data from the first and second scan can be time stamped by the local computer system, the time stamp including a date and time. Data from the first and second scan can include site identification.

In still another aspect, the invention features a employee tracking system including a Radio Frequency Identification (RFID) tag, a first computer system for prompting a user for identification input, validating the identification input, receiving data from a first scan of the RFID tag upon initiation of a task, and receiving data from a second scan of the RFID tag upon termination of the task, and a second computer system for receiving, storing and correlating an upload the identification input and the data of the first and second scan.

In embodiments, the first computer system can be a portable computer having an RFID reader. The portable computer having an RFID reader can be a pocket personal computer (PC) with an RFID reader plug-in.

Data from the first and second scan can be time stamped by the first computer system, the time stamp including a date and time. Data from the first and second scan can include site identification.

The invention can be implemented to realize one or more of the following advantages.

The system and method enable tracking the whereabouts and arrival and departures times of field-based employees at remote sites.

A trusted employee can place an RFID tag in a known location for subsequent use by one or more non-trusted employees. In one example, the trusted employee places the tag in the known location and the placed tag's serial number is recorded.

The system and method enable the generation of reports that reflect field-based employee identification along with start and end dates and times with respect to specific job sites visited by the field-based employee.

The system and method enable a field-based employee to communicate with a remote computer system.

The system and method enable accurate and non-counterfeitable verification of a field-based employee's job activities.

One implementation of the invention provides all of the above advantages.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Figure 1:
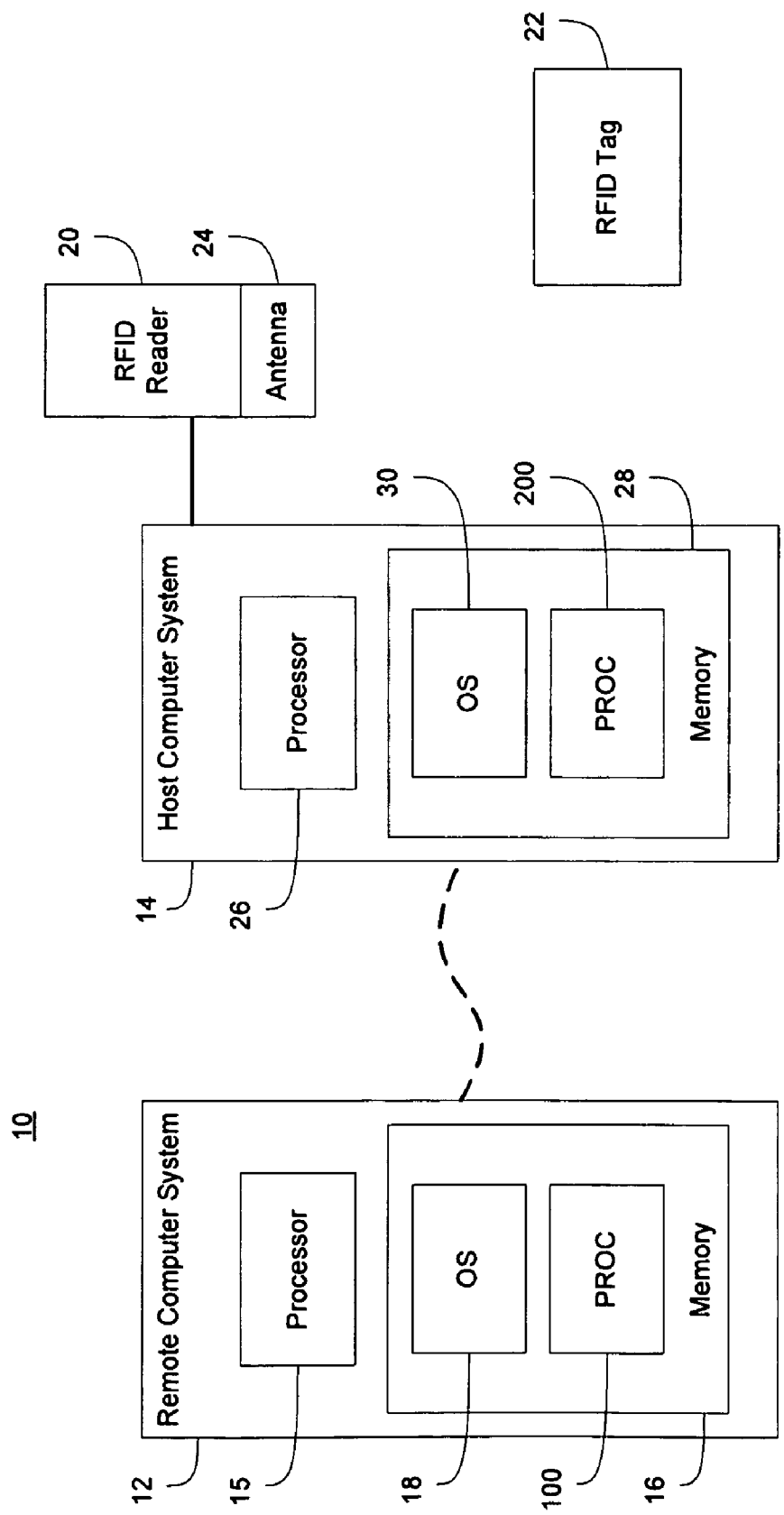
FIG. 1 is a block diagram of an exemplary Radio Frequency Identification (RFID)-based personnel tracking system.

As shown in FIG. 1, an exemplary Radio Frequency Identification (RFID)-based personnel tracking system 10 includes a remote computer system 12 linked to a host computer system 14. The link between the remote computer system 12 and the host computer system 14 can be a network link, such as the Internet, a wireless link or a telephone link between a modem residing in the remote computer system 12 and the host computer system 14.

The remote computer system 12 can include a processor 15 and memory 16. Memory 16 includes an operating system 18, such as Linux or Microsoft Windows®, and a tracking/reporting process 100, described below.

The host computer system 14 is linked to an RFID reader 20 (also referred to as a read/write device or interrogator). The system 10 also includes an RFID tag 22 (also referred to as a transponder). RFID incorporates the use of electromagnetic or electrostatic coupling in the radio frequency (RF) portion of the electromagnetic spectrum to uniquely identify an object, animal, or person. An advantage of RFID is that it does not require direct contact or line-of-sight scanning. Another advantage is RFID, unlike bar codes, is hard to counterfeit.

In this example, the RFID reader 20 includes a built-in antenna 24 that uses radio frequency waves to transmit a signal that activates the transponder 22. When activated, the tag 22 transmits data back to the antenna 24. The RFID tag 22 can hold many types of data, such as a serial number or identification number.

RFID tags, such as RFID tag 22, are either passive, active or battery assisted. Passive RFID tags receive their power to exchange from the signal sent by the RFID reader 20. Active RFID tags have a battery to power their own transmissions. Battery assisted RFID tags have a battery that powers chip electronics but does not transmit RF energy.

RFID tags, such as RFID tag 22, can be read-only or read-write. Read-only RFID tags are programmed with an identification number or other data at the manufacturer's site and cannot be altered. Data on read/write RFID tags can be revised or erased thousands of times by the user.

In a preferred example, system 10 uses read-only passive RFID tags. In this preferred example, the host computer system 14 and reader 20 with antenna 24 are integrated into a single hand-held portable computing device, such as a smartphone or PDA with built-in RFID reader, a Pocket PC with plug-in RFID reader card, and other computing devices with RFID capabilities. A smartphone is any electronic handheld device that integrates the functionality of a mobile phone, personal digital assistant or other information appliance.

An example plug-in RFID reader card is the Socket™ RFID Reader Card Series 6 from Socket Communications, Inc., of Newark, Calif. A Pocket PC, also referred to as a P/PC or PPC, is a handheld-sized portable computer that runs, for example, Microsoft Corporation's Windows CE® operating system. A Pocket PC has many capabilities of modern desktop personal computers. Pocket PCs can be used with many add-ons (e.g., plug-ins), like Global Positioning System (GPS) receivers, barcode readers, RFID readers and cameras.

Pocket PC with plug-in RFID reader card includes a processor 26 and memory 28. Memory 28 includes an operating system 30, such as Windows CE®, and a remote tracking process 200, described below.

The RFID-based personnel tracking system 10 is used to keep track of the whereabouts and/or arrival and departure times of field-based employees, e.g. nurses, field technicians, delivery and repair personnel or the like, at various work sites, such as the homes of patients or the like. In such cases, a passive read-only RFID tag 22 is placed in each work site of interest. In one particular example, a trusted employee places the RFID tag in a known location for subsequent use by one or more non-trusted employees. For example, an RFID tag 22 can be affixed to a refrigerator door in a patient's home. Each field-based employee is assigned a user identification (ID) and a Pocket PC with plug-in RFID reader card. When a field-based employee is dispatched, upon arriving at the site the employee initiates the remote tracking process 200 on the employee's pocket PC with plug-in RFID reader. The remote tracking process 200 prompts the employee to scan the RFID tag 22 located at the site at initiation of the visit. After the employee scans the RFID tag, the remote tracking process 200 waits until the employee inputs an indication of a termination of the visit. Upon receiving the termination input from the employee, the remote tracking process 200 prompts the field-based employee to scan the RFID tag 22. Once the RFID tag 22 is scanned, the remote tracking process 200 waits for the initiation of another remote visit by the field-based employee at another site or a signal indicating that all scheduled visits for the time period have been completed.

At periodic times, such as after each scan, once a day, once a week, or once a month, the field-based employee connects the pocket PC with RFID reader plug-in to a network access point, such as a telephone line. Remote tracking process 200 initiates communication with tracking/reporting process 100 in remote computer system 12. Data stored in the pocket PC with respect to each RFID scanned during the period is transferred over the network access point, e.g., modem line, for processing by the tracking/reporting process 100.

The tracking/reporting process 100 stores the data. The data can include (and be indexed by) a field-based employee identification (ID), site ID, start time of visit, end time of visit, date of visit, and so forth. The tracking/reporting process 100 can correlate dates and times against scheduled visits. The data is stored in remote computer system 12 for later use in developing reports and to insure that the field-based employee has been to the remote site where he or she has been prescheduled to appear. Alternatively, information that a certain field-based employee has appeared at other than the pre-designated location can be relayed immediately to an employer to whom receipt of such information might be valuable.

Once all data has been transferred from the particular pocket PC with RFID reader plug-in, the data can be used to generate one or more reports. For example, at a conclusion of each day and/or any other desired or predefined reporting period, tracking/reporting process 100 generates various reports for the employees of one or several companies, indicating and/or providing a list of dates, the arrival and departure times of each employee and the place where services have been performed. These reports can be stored in a database, for example. The information in the database can then forwarded to subscribers or users as hard copy output, electronically (e.g., email), and/or through a direct computer connection to remote computer system 12 (e.g., secure web site). The reports can be sent, for example, asynchronously, synchronously or through Wide Area Networks (WANs).

Figure 2:
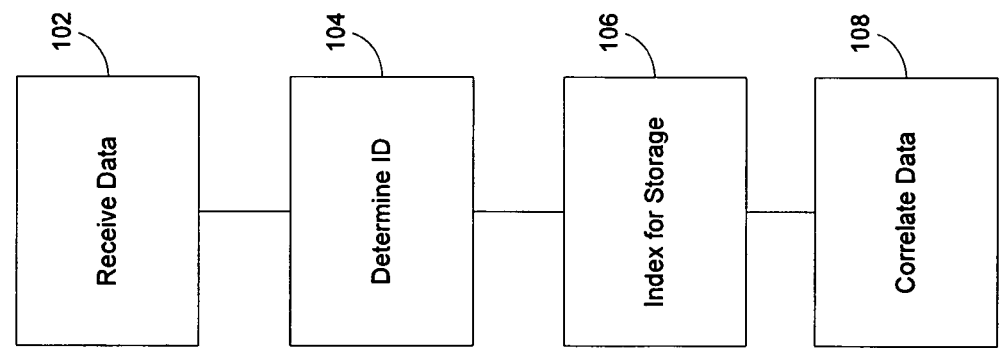
FIG. 2 is a flow diagram.

As shown in FIG. 2, process 100 includes receiving (102) data from a computer system of a field-based employee. Data can be received, for example, over a modem/telephone line, a public network or a private network. Process 100 determines (104) a user identification associated with the received data and indexes (106) the received data by user identification for storage.

Process 100 correlates (108) date and time data against scheduled visits. The data is stored for later use in developing reports and to insure that the field-based employee associated with the user ID has been to the remote site where he or she has been prescheduled to appear. The reports can be viewed by a subscriber or emailed to a designated user address. Alternatively, information that a certain field-based employee has appeared at other than the pre-designated location can be relayed via email, for example, to an employer to whom receipt of such information might be valuable.

Figure 3:
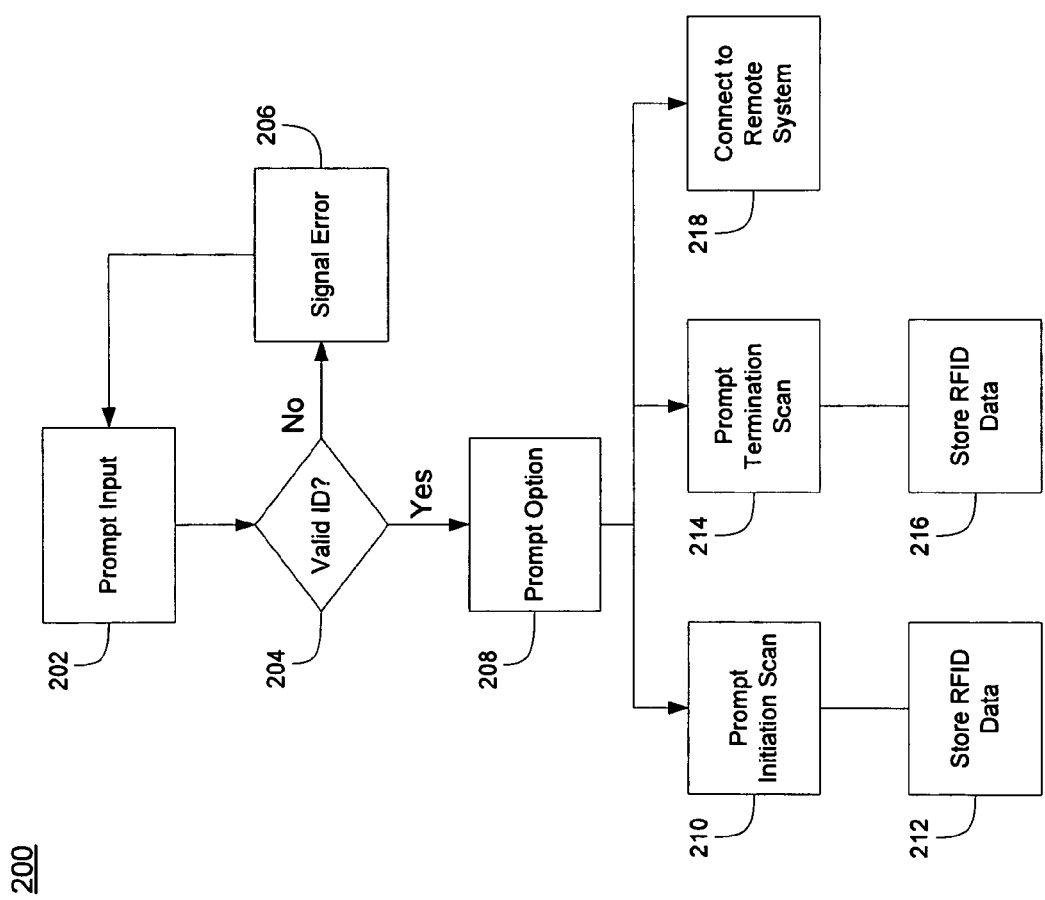
FIG. 3 is a flow diagram.

As shown in FIG. 3, process 200 includes prompting (202) a user to enter a user identification (ID). The user ID identifies a unique field-based employee. Process 200 determines (204) whether the received user ID is valid. If the received user ID is invalid, process 200 signals (206) an error and prompts (202) the user to enter a user ID. If the received user ID is valid, process 200 prompts (208) the field-based employee to enter an option. If the inputted option represents initiation of a site visit, process 200 prompts (210) the user to scan an RFID tag located at the visited site.

After the field-based employee scans the RFID tag, process 200 stores (212), for example, a current date and time of the site visit initiation, as provided by the operating system of the field-based employee's handheld computer/RFID reader, a site identification from the RFID tag, and additional information, if needed.

If the inputted option represents a termination of the site visit, process 200 prompts (214) the user to scan an RFID tag located at the visited site. After the field-based employee scans the RFID tag, process 200 stores (216), for example, a current date and time of the site visit termination, as provided by the operating system of the field-based employee's handheld computer/RFID reader, a site identification from the RFID tag, and additional information, if needed.

If the inputted option represents reporting, process 200 connects (218) to a network and begins upload of the stored data to a remote computer system. Connecting (218) can be, for example, dialing a modem or linking over a public or private network.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method of tracking employees comprising:
   prompting a user for identification input from a portable computer system;
   validating the identification input on the portable computer system;
   receiving, on the portable computer system, data from a first scan of a Radio Frequency Identification tag, associated with a fixed location, upon initiation of a task;
   receiving, on the portable computer system, data from a second scan of the Radio Frequency Identification tag upon termination of the task; and
   uploading, from the portable computer system, the identification input and the data of the first and second scans to a remote computer system for storage and correlation.

2. The method of claim 1 wherein the portable computer system includes a Radio Frequency Identification tag reader.

3. The method of claim 2 wherein the portable computer system comprises a pocket personal computer with a Radio Frequency Identification tag reader plug-in.

4. The method of claim 1 wherein the data from the first and second scans include data representing a date and time.

5. The method of claim 4 wherein the data from the first and second scans include data representing a site identification.

6. The method of claim 1 further comprising:
   generating a report from a correlation of the identification input, the data from the first scan, and the data from the second scan.

7. The method of claim 6 further comprising:
   transmitting the report to a report subscriber.

8. The method of claim 7 wherein the report subscriber is an employer of the user.

9. A method of tracking comprising:
   entering a user identification from a user into a portable computer system;
   receiving, on the portable computer system, data from a first scan of a Radio Frequency Identification tag, associated with a fixed location, upon the initiation of a task;

receiving, on the portable computer system, data from a second scan of the Radio Frequency Identification tag upon the termination of the task; and storing the user identification and the data of the first and second scans on a remote computer system.

10. The method of claim 9 further comprising sending the user identification, the data from the first scan, and the data from the second scan to a remote computer system for storage and manipulation.

11. The method of claim 9 wherein the portable computer system includes a Radio Frequency Identification tag reader.

12. The method of claim 11 wherein the portable computer system comprises a pocket personal computer with a Radio Frequency Identification tag reader plug-in.

13. The method of claim 9 wherein the data from the first and second scans include data representing a date and time.

14. The method of claim 13 wherein the data from the first and second scans include data representing a site identification.

* * * * *